June 28, 1966    R. H. RESCHKE    3,258,144
SELF-ALIGNING POWER AND IDLER ROLLER SUPPORTING
ASSEMBLIES FOR A TURNING ROLL APPARATUS
Filed May 4, 1964    2 Sheets-Sheet 2

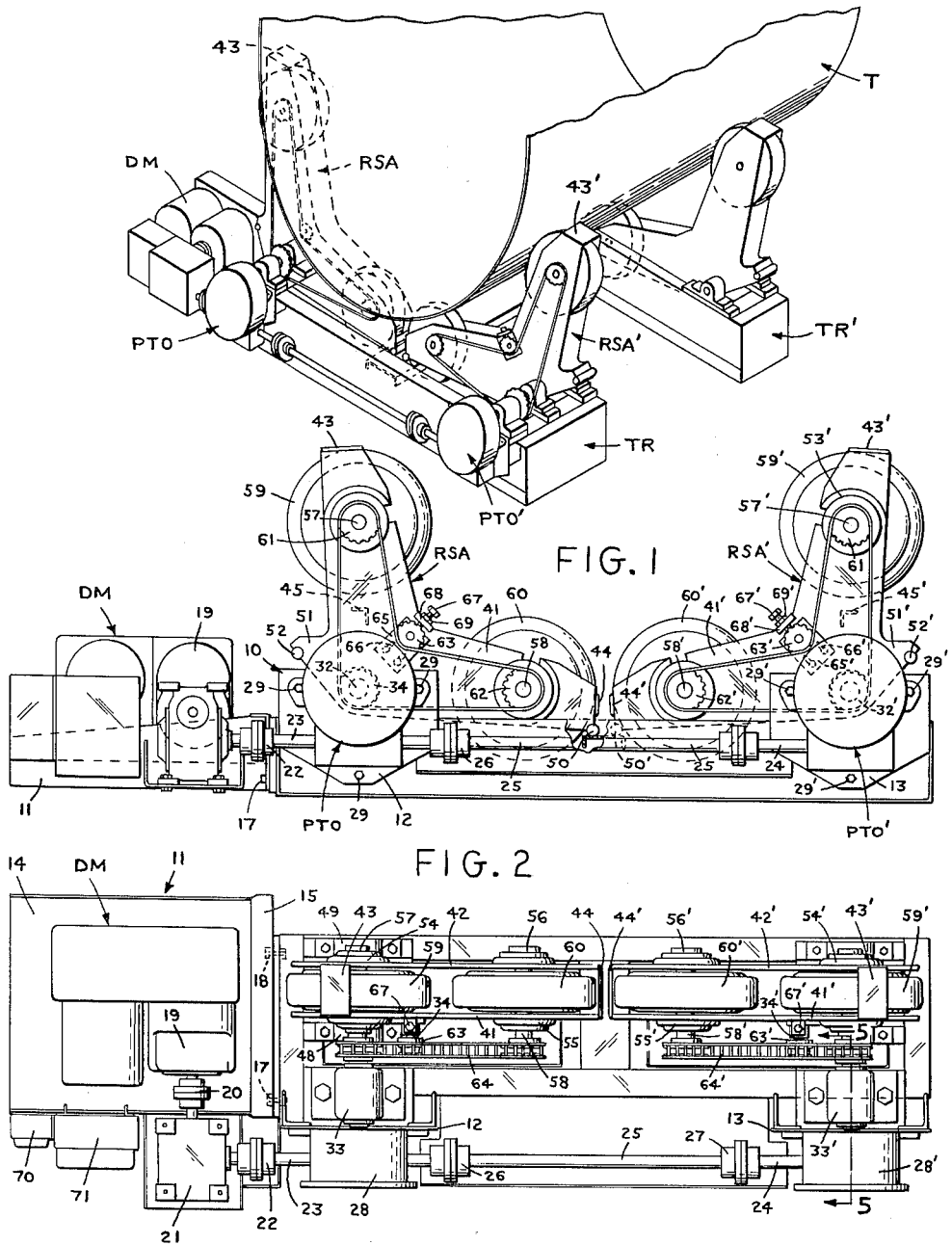

RALPH H. RESCHKE
INVENTOR.

BY Daniel H. Bobis
        Atty

United States Patent Office 3,258,144
Patented June 28, 1966

3,258,144
SELF-ALIGNING POWER AND IDLER ROLLER SUPPORTING ASSEMBLIES FOR A TURNING ROLL APPARATUS
Ralph H. Reschke, Berkeley Heights, N.J., assignor to Big Three Welding Equipment Co., Houston, Tex., a corporation of Texas
Filed May 4, 1964, Ser. No. 364,719
7 Claims. (Cl. 214—340)

This invention relates generally to apparatus for supporting and rotating cylindrically shaped pipes, tanks, vessels and the like type work pieces, and more particularly to a turning roll wherein the roller supporting assemblies thereof automatically position themselves in accordance with the size of the work piece and equalize the load between the roller elements; said roller supporting assemblies being further adapted by relatively simple means to be powered or idled as may be required at the point of use.

Techniques for holding and rotating both large and small cylindrical work pieces have been developed particularly for the welding art but adaptable to a variety of other applications. They are identified in the commercial market as turning rolls.

Turning rolls wherein the roller elements are powered and are adapted to adjust to the size of the piece being rotated are known. However these prior art turning rolls are met with many disadvantages which affect manufacture, mechanical operation, increase maintenance and limit the use of the rolls.

For example, in one known device the main pivot shaft also holds the driving gear for the driving belt which powers the rollers, so that alignment in manufacture becomes difficult and the shaft itself breaks down quickly. This type turning roll is also extremely difficult to convert from a powered turning roll to one where the roll supporting assemblies operate in idling position which factor of interchangeability is particularly characteristic of the present invention.

Another factor is that these known devices are mounted on bed plates and this affects alignment and ease of assembly in their manufacture.

Other factors which affect the use of such turning roll devices of the prior art are the techniques for controlling the limit of pivotal movement of the roller supporting assemblies and the means for taking up slack or lost motion which develops in the chain or gear belt drive for the rollers in the roller supporting assemblies.

The present invention overcomes these problems by providing a self-aligning turning roll wherein a pair of coacting and operatively associated roller supporting assemblies are disposed on pivotal means independent of the power means for rotating the rollers therein, which power means can be adjustably and detachably converted so the turning roll can be power operated or idler operated as may be required.

Accordingly, it is an object of the present invention to provide a turning roll alternatively adapted to rotatably support or to support and rotate a work piece wherein coacting roller supporting assemblies align themselves as a function of the size of the work piece and equate to the respective rollers in said roller supporting assemblies an equal share of the total load.

It is an object of the present invention to provide an improved turning roll which is simpler to manufacture and wherein maintenance problems are reduced.

It is another object of the present invention to provide a turning roll which is adapted by relatively simple means to change from power operation to idler operation.

Further objects and advantages of the invention will become evident from the following description with reference to the accompanying drawings in which:

FIGURE 1 is a perspective view of a pair of self-aligning turning rolls supporting a cylindrical work piece, one of which turning rolls is in accordance with the present invention.

FIGURE 2 is a side elevation of a preferred form of the present invention.

FIGURE 3 is a plan view of the form of the invention shown in FIGURE 2.

Figure 4:
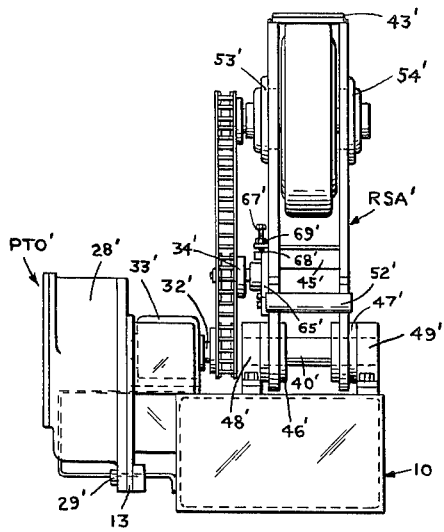
FIGURE 4 is an end view of the form of the invention shown in FIGURE 2.

Referring to the drawings, FIGURE 1 illustrates the usual way of holding a tank T between a pair of turning rolls generally designated TR and TR'.

Generally if the tank T is not too long or too heavy one of the turning rolls as at TR will be powered and the other as at TR' will be an idler which merely supports and rotates with the rotation of the tank T.

It is of course possible to use two powered turning rolls in accordance with the present invention, one of which can be converted from powered to idler operation, and vice versa as required for the size and weight of the work piece. However, as will be understood by those skilled in the art, when the powered units are used simultaneously they will require a synchronizing device to prevent overrunning of one by the other during the rotation of the work piece.

The advantage of the turning roll of the present invention is that it can be changed over from power to idler operation by a simple expedient as is more fully described hereinafter.

Referring to the drawings, FIGURES 2, 3 and 4 show the turning roll TR as including a plurality of channel shaped elements which are preferably welded together to form a unitary frame generally designated 10. The frame 10 will rest on the floor or other location for the apparatus and will serve to support the remaining portions in assembled position.

The roller supporting assemblies designated generally RSA and RSA' are mounted in the frame 10. The driving means generally designated DM is mounted on a motor support bracket 11, which is connected at one end to the frame 10 so that the bracket does not rest on the same surface which supports the main frame 10 but overhangs therefrom for purposes which will appear clear hereinafter.

The associated power transmitting means connected between the driving means DM and the roller supporting assemblies RSA and RSA' is mounted on brackets 12 and 13 disposed on the side of the main frame 10, all of which is clearly shown in FIGURES 2, 3, 4 and 5 of the drawings.

The motor support bracket 11 includes a generally rectangularly shaped bottom member 14 and side member 15. The side member 15 provides means for bolting the motor support bracket to the main frame as indicated by the threaded members 17 and 18. Mounted on the motor support bracket is any suitable sort of driving mechanism such as an electric motor 19 which is connected as by a coupling 20 to a gear reducer 21 in turn connected by a coupling 22 to the primary shaft 23 of the driving assembly.

The couplings 20 and 22 and the gear reducer are conventional elements which are easily purchasable on the open market. Accordingly they are not more fully described herein because they do not form any part of the present invention.

By reference to FIGURES 2, 3, 4 and 5 of the drawings, it can be seen that the power transmitting assembly is related to the number of roller supporting assemblies and there will be a separate power means or take off PTO and PTO' to drive the rollers in each of the roller supporting assemblies.

As a consequence, each of the power take offs PTO and PTO' not only has its own shaft as indicated by the primary shaft 23 and the secondary shaft 24, but because of the overall relation of the roller supporting assemblies to each other these power means or take offs PTO for ease of assembly and operation are disposed in alignment with each other so that the primary shaft 23 and the secondary shaft 24 can be connected to each other by the connecting shaft 25 which is coupled at one end as by a coupling 26 to the end of the primary shaft remote from coupling 22 and at the other end by means of coupling 27 to the end of the secondary shaft 24.

The primary shaft 23 and the secondary shaft 24 each extend through a power means or power take off housing as at 28 and 28' which housing is connected by threaded means 29 and 29' for the respective take off housings 28 and 28' to the brackets 12 and 13 provided on the side of the frame 10.

Figure 5:
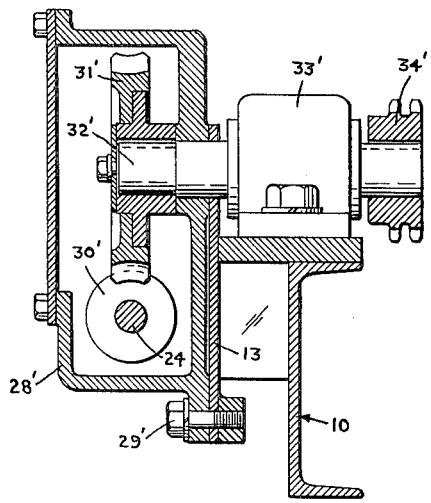
FIGURE 5 is a vertical section taken on line 5—5 of FIGURE 3.

FIGURE 5 shows a view taken through the secondary shaft and represents a typical takeoff for the roller supporting assembly.

Thus, the secondary shaft 24 has a worm 30' mounted thereon which meshes with a gear 31' mounted at one end of a driven shaft 32' supportably disposed in a bearing means 33' and to extend past the bearing 33' where it receives the main driving sprocket 34'.

The corresponding elements visible in the drawings for the primary shaft 22 have been designated with the character numerals, without the prime designation.

The main driving sprockets 34 and 34' in each of the power take offs PTO and PTO' serves to drive the respective roller supporting assembly RSA and RSA' with which it is associated.

It is further noted with particular reference to FIGURES 3, 4 and 5, that the driven shafts 32 and 32' are independent of the main pivot shafts 40 and 40' in the respective roller supporting assemblies RSA and RSA'.

*Roller supporting assemblies*

The roller supporting assemblies RSA and RSA' are substantially identical with each other. Therefore only the roller supporting assembly associated with the secondary shaft 24 will be specifically described and the corresponding elements of the roller supporting assembly associated with the primary shaft 23 will be given the same character numeral without the prime description.

Thus, the roller supporting assembly RSA' is shown to include a pair of roller supports designated 41' and 42' which are held in spaced relationship to each other by transverse end elements as at 43' and 44' and a transverse medial element 45' as is clearly shown in FIGURES 2, 3 and 4 of the drawings.

The roller supports 41' and 42' have a wide V or crank arm shape and are provided with bosses 46' and 47' at the vortex of the wide V. Bosses 46' and 47' are bored to permit the main pivot shafts 40' to extend therethrough to provide means for pivotally mounting the roller supporting assembly in the spaced bearing means 48' and 49' connected to the portion of the frame 10.

FIGURES 1, 2, 3 and 4 show that the bearing means 48 and 49 for roller supporting assembly RSA are disposed in spaced relation to the bearing means 48' and 49' of the roller supporting assembly RSA'. When the roller supports 41 and 42 for assembly RSA and 41' and 42' for assembly RSA' are mounted in assembled position by their respective main pivot shafts 40 and 40' they are disposed so the roller supporting assemblies RSA and RSA' work in pairs and are adapted to pivot toward and away from each other. By reference to FIGURES 1 and 5, the operative coaction between these assemblies will appear clear.

At the inner portion of the roller supports 41' and 42' the lower side is provided with a transverse or inner limit stop member 50'. When the crank arm or roller supports 41 and 42 and 41' and 42' are in the position as shown in FIGURE 2 the stop members 50 and 50' abut the upper surface of the frame 10.

Figure 6:
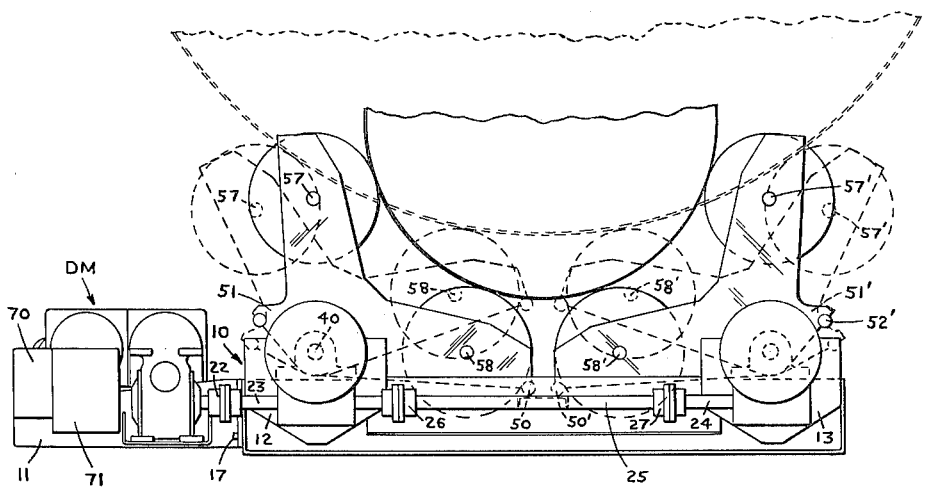
FIGURE 6 is a diagrammatic illustration showing in phantomized form a range of rotation of a pair of cooperating roller supporting assemblies for the form of the invention shown in FIGURE 2.

At the vortex remote from the inner stop member 50' the roller supports have a rearwardly projecting portion 51' shown clearly in FIGURES 1, 2 and 6 of the drawings which is cut at an angle of about 40° to a vertical plane through the main pivot shaft 40' such that the roller supporting assemblies RSA and RSA' can swing approximately 45 degrees when the outer limit stop 52' comprising a transverse bar will engage the upper portion of the frame on rotation of the assemblies to their maximum positions.

On the respective arms of the V-shaped roller supports are outer bearing elements as at 53' and 54' shown in FIGURE 4 at one end and inner bearing elements 55' and 56' shown in FIGURE 3 at the other end. Each pair of bearings receive the respective outer and inner roller shafts 57' and 58' on which the respective outer and inner rollers 59' and 60' are mounted so as to rotate therewith at all times.

The roller shafts extend beyond one side of the respective roller supports 41' and 42' to provide means for mounting sprockets as at 61' and 62'.

As shown clearly in FIGURES 2, 3 and 4, the sprockets 61' and 62' and the main driving sprocket 34' are in alignment with each other and an associated idling sprocket 63' to permit a chain or belt 64' to be mounted thereabout and to be held in assembled relation so as to turn the sprocket 61' and 62' when the power take off assemblies PTO' transmit the rotational forces from the motor DM.

Figure 7:
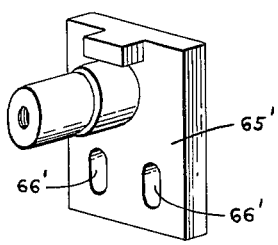
FIGURE 7 is a perspective view of the adjustable support element for the idler sprocket.

The idling sprocket 63' is on an idler sprocket support 65' shown in FIGURE 7, slidably mounted as by slots 66' and bolts to the roller support 41' and is moved by threaded member 67' threadably mounted on flange 68' on the roller support 41'. When threaded inwardly or outwardly, the threaded member 67' will move the idler sprocket support 65' so as to increase or decrease the tension of the idler sprocket 63' on the associated drive belt 64' for the roller supporting assembly in which it is utilized. A locking nut 69' will hold the threaded member in adjusted position after the proper tension on the drive belt 64 is established.

When it is desired to remove the drive belt 64' to permit the rollers 59' and 60' to idle, the threaded member 67' is turned as to release all tension and render the drivebelt slack enough to permit it to be slipped off of the sprockets 61 and 62.

This is particularly simple to do in the present construction because the shafts 32 and 32' of the power take off assemblies PTO and PTO' and the main pivot shafts 40 and 40' of the roller supporting assemblies RSA and RSA' are independent of each other.

When the rollers 59' and 60' are to be power operated the drive belt 64' is once again positioned as shown in FIGURES 2, 3 and 4 and the threaded member 67 brought up to proper tension for operation.

Furthermore because the motor support bracket is cantilevered over one side of the main frame 10 the relative problems of alignment between the driving motor and the power transmission elements to the proper take offs PTO and PTO' for each of the roller supporting assemblies can be aligned more easily and more consistently from the manufacture of one turning roll to the next. The gross alignment can be established from the cantilevered relationship and individual variations of machine to machine can be taken care of by relatively simple shimming at critical points where actual alignment is necessary for proper and effective operation of the apparatus.

Operation

In operation, the turning rolls TR and TR' are set in position at the point of use.

The work piece such as the tank T is moved in operating position either manually or by suitable hoisting devices.

FIGURE 6 illustrates the diagrammatic form of various associated positions of a pair of turning rolls and indicates that for each respective turning roll, depending upon the size of the workpiece, there can be a minimum diameter workpiece, various intermediate size workpieces or a maximum size workpiece as when the outer stop members engage the upper surface of the main frame.

It is clear from the diagrammatic sketch that the rollers automatically adjust and coact to support the load so they will bear substantially equal amounts of the total load of the workpiece being rotated.

The driving motor DM will be controlled by transformer 70 and reversing starter 71 of conventional design which permits operation or rotation of the motor 19 in a clockwise or counterclockwise direction as may be desired.

Whatever the direction of rotation, it will be transmitted through the coupling 20, gear reducer 21, and coupling 22 to the primary shaft 23. Since primary shaft 23 is directly coupled by coupling 26, connecting shaft 25, coupling 27 rotation will be imparted to secondary shaft 24. This rotation in the respective power take offs PTO and PTO' will be transmitted to the main driving sprockets 34 and 34' through the elements above described and by drive chains or belts 64 and 64' to the sprockets 61 and 62 on roller supporting assembly RSA and sprockets 61' and 62' on roller supporting assembly RSA'. Since the rollers are directly connected to the sprockets 61 and 62 and 61' and 62' they will be rotated in the desired direction and speed thus transmitted.

It will be understood that the invention is not to be limited to the specific construction or arrangement of parts shown but that they may be widely modified within the invention defined by the claims.

What is claimed is:

1. A self-aligning turning roll for supporting and rotating a workpiece to be power operated and idler operated interchangeably comprising
   (a) a pair of operatively associated roller supporting assemblies disposed in spaced relation to each other and on separate pivot shafts to permit said roller supporting assemblies to pivot towards and away from each other,
   (b) roller means mounted in said roller supporting assemblies in spaced relation,
   (c) power means on shaft means independent of the separate pivot shafts for each of said roller supporting assemblies and connected for rotation of said roller means,
   (d) and a means for adjusting and disconnecting said power means from said roller means to permit the roller means on said roller supporting assemblies to operate as idlers.

2. A self-aligning turning roll for supporting and rotating a workpiece to be power operated and idler operated interchangeably comprising
   (a) a frame
   (b) a pair of operatively associated roller supporting assemblies mounted on the frame in spaced relation to each other and on separate axes to permit said roller supporting assemblies to pivot towards and away from each other,
   (c) rollers in said roller supporting assemblies disposed to adapt to the circumberence of the workpiece on pivoted movement of said roller supporting mechanism to distribute the load in equal proportion on said rollers,
   (d) said roller supporting assemblies each having a main pivot shaft,
   (e) power transmitting means mounted on said frames having driving shafts independent of the main pivot shaft for each of the associated roller supporting assemblies,
   (f) means connecting said power means to said rollers to impart rotation thereto,
   (g) and means operatively coacting with said connecting means to adjust the tension of said connecting means and to permit said connecting means to be detached from driving connection with the rollers.

3. In a self-aligning turning roll as claimed in claim 2 wherein said power means includes, a driving motor connected in overhung relation on the frame, a power transmitting assembly mounted on said frame in alignment with and operatively connected to said driving motor and to the rollers in said roller supporting assemblies.

4. In a self-aligning turning roll as claimed in claim 2 wherein said roller supporting assemblies have means to limit the extent of pivoted rotation in clockwise and counterclockwise directions.

5. In a self-aligning turning roll as claimed in claim 4 wherein said limit means includes, an inner stop means on each of the roller supporting assemblies, an outer projecting element on each of said roller supporting assemblies, an outer stop means connected to said outer projecting element on a line at an angle approximately 40° from the vertical plane through the main pivot shaft for each of the respective roller supporting assemblies.

6. A self-aligning turning roll for supporting and rotating a workpiece to be power operated and idler operated interchangeably comprising,
   (a) a frame,
   (b) a pair of operatively associated roller supporting assemblies mounted on the frame in spaced relation to each other and on separate axes to permit said roller supporting assemblies to pivot towards and away from each other,
   (c) rollers in said roller supporting assemblies disposed to adapt to the circumference of the workpiece on pivotal movement of said roller supporting mechanism to distribute the load in equal proportions on said rollers,
   (d) said roller supporting assemblies each having a main pivot shaft,
   (e) power transmitting means mounted on said frames having driving shafts independent of the main pivot shaft for each of the associated roller supporting assemblies,
   (f) a main driving sprocket on the driving shaft for said power transmitting means,
   (g) driven sprockets connected to the rollers on said roller supporting assemblies and disposed in alignment with said main driving sprocket, (h) means connecting said main driving sprocket to the driven sprockets to impart rotation thereto, (i) and means operatively coacting with said connecting means to adjust the tension of said connecting means and to permit the connecting means to be detached from driving connection with the driven sprockets.

7. In a self-aligning turning roll as claimed in claim 6 wherein the last mentioned means includes, an idler sprocket support slidably and adjustably disposed in each of the roller supporting assemblies, an idler sprocket mounted on said idler sprocket support and disposed to engage the connecting means, and means to remove said idler sprocket support to increase or decrease the tension of said connecting means.

References Cited by the Examiner
FOREIGN PATENTS
622,160 6/1961 Canada.

HUGO O. SCHULZ, *Primary Examiner.*